_United States Patent_ [15] 3,666,742
Calderon
[45] May 30, 1972

[54] POLYMERIZATION OF CYCLIC OLEFINS CONTAINING TWELVE CARBON ATOMS

[72] Inventor: Nissim Calderon, Akron, Ohio
[73] Assignee: The Goodyear Tire & Rubber Company, Akron, Ohio
[22] Filed: Dec. 4, 1970
[21] Appl. No.: 95,360

Related U.S. Application Data

[63] Continuation-in-part of Ser. No. 785,032, Dec. 10, 1968, which is a continuation of Ser. No. 477,035, Aug. 3, 1965, which is a continuation-in-part of Ser. No. 448,872, Apr. 16, 1965.

[52] U.S. Cl. ............................................................260/93.1
[51] Int. Cl. .................................................................C08f 7/02
[58] Field of Search.................................................260/93.1

[56] References Cited

UNITED STATES PATENTS

| | | | |
|---|---|---|---|
| 3,449,310 | 6/1969 | Dall'Asta et al. | 260/93.1 |
| 3,459,725 | 8/1969 | Natta et al. | 260/93.1 |
| 3,575,947 | 4/1971 | Crain | 260/93.1 |

Primary Examiner—Joseph L. Schofer
Assistant Examiner—Richard A. Gaither
Attorney—F. W. Brunner and J. Y. Clowney

[57] ABSTRACT

This invention relates to polymers derived from the ring opening polymerization of unsaturated alicyclic compounds containing at least one alicyclic ring, said ring containing 12 carbon atoms and having two or three nonconjugated carbon-to-carbon double bonds in the cyclic ring. Methods for their preparation are also disclosed.

4 Claims, No Drawings

POLYMERIZATION OF CYCLIC OLEFINS CONTAINING TWELVE CARBON ATOMS

This application is a continuation-in-part of application Ser. No. 785,032, filed Dec. 10, 1968, which in turn is a continuation of application Ser. No. 477,035, filed Aug. 3, 1965, which in turn is a continuation-in-part of application Ser. No. 448,872, filed Apr. 16, 1965.

This invention relates to polymers derived from the ring opening polymerization of unsaturated alicyclic compounds containing at least one alicyclic ring, said ring containing 12 carbon atoms and having two or three non-conjugated carbon-to-carbon double bonds in the cyclic ring, and to their preparation.

In accordance with this invention, it has been found that polymeric materials can be produced from unsaturated alicyclic compounds which contain at least one alicyclic ring, said ring containing 12 carbon atoms and having two or three non-conjugated carbon-to-carbon double bonds in the alicyclic ring by subjecting the said alicyclic compounds to a ring opening polymerization in the presence of a catalyst system which comprises at least one organometallic compound of the metal selected from Groups I$a$, II$a$, II$b$ and III$a$ of the Periodic Table of Elements and at least one salt of metals selected from Group VI$b$ of the Periodic Table of Elements. The Periodic Table of Elements referred to may be found in the Handbook of Chemistry and Physics, 44th Edition, Apr., 1962, page 44, published by The Chemical Rubber Publishing Company, Cleveland, Ohio.

Representative examples of metals from which the organometallic compound can be derived are lithium, sodium, potassium, rubidium, cesium, beryllium, magnesium, calcium, strontium, barium, zinc, cadmium, mercury, aluminum, gallium, indium, and thallium. The preferred organometallic compounds are compounds of lithium, sodium, magnesium, aluminum, gallium, indium, zinc and cadmium.

Representative examples of organometallic compounds are aluminum compounds having at least one aluminum to carbon bond, which are, for example, trialkylaluminums such as trimethylaluminum, triethylaluminum, tri-n-propylaluminum, tri-n-butylaluminum, triisobutylaluminum, trihexylaluminum, trioctylaluminum and the like; dialkylaluminum halides such as diethylaluminum chloride, di-n-propylaluminum chloride, diisobutylaluminum chloride, diethylaluminum bromide, diethylaluminumiodide and the like; alkylaluminum dihalides such as ethylaluminum dichloride, ethylaluminum dibromide, ethylaluminum diiodide and the like; dialkylaluminum hydrides such as diethylaluminum hydride, di-n-propylaluminum hydride, dibutylaluminum hydride and the like; the triarylaluminums such as triphenylaluminum and the like; the arylaluminum hydrides and dihydrides such as diphenylaluminum hydride and phenylaluminum dihydride. Other organometallic compounds, particularly those capable of reducing a Group VI$b$ metal salt to a lower valence state may also be used. Representative of such organometallic compounds are alkyllithium compounds such as ethyllithium, butyllithium and the like; lithium aluminum tetraalkyls such as lithium aluminum tetrabutyl, lithium aluminum tetraethyl and the like; alkali metal alkyls and aryls such as amylsodium, phenyllithium and the like; alkyls and aryls of Group II$a$ metals such as diphenylmagnesium, diethylcalcium and the like; alkyls of Group II$b$ metals such as diethylzinc, diethylcadmium and the like; and Grignard agents such as phenyl magnesium bromide and the like. Mixtures of these compounds may also be employed, if desired. It is usually preferred to employ trialkylaluminums such as triethylaluminum, tri-n-propylaluminum, triisobutylaluminum, trihexylaluminum and the like.

The metals salts employed in the catalyst of this invention are salts of metals of Group VI$b$ of the Periodic System and include chromium salts, molybdenum salts and tungsten salts. Representative of such salts include halides such as chlorides, bromides, iodides and fluorides which include compounds such as molybdenum pentachloride, molybdenum hexachloride, tungsten hexachloride, molybdenum pentabromide, molybdenum hexabromide, tungsten hexabromide, molybdenum pentaiodide, molybdenum hexaiodide, tungsten hexaiodide, molybdenum pentafluoride, molybdenum hexafluoride and tungsten hexafluoride. Other representative salts are those of acetates, benzoates, acetylacetonates, sulphates and the like which include compounds such as molybdenum acetate, tungsten acetate, molybdenum benzoate, tungsten benzoate, molybdenum acetylacetonate, tungsten acetylacetonate, molybdenum sulphate and tungsten sulphate. Mixtures of these salts may also be employed. Of these, it is usually preferred to employ tungsten halides and molybdenum halides representative of which are tungsten hexachloride and molybdenum pentachloride.

The various unsaturated alicyclic compounds which may be useful in this invention are the unsaturated alicyclic compounds containing twelve carbon atoms in the ring and having two or three non-conjugated double bonds in the ring. These unsaturated alicyclic compounds are sometimes referred to as cycloaliphatic compounds or cycloolefinic compounds.

The cycloolefinic rings may be substituted by groups such as alkyl, aryl, aralkyl, alkaryl, acyl, alkoxy, cyano, halogen, carboalkoxy, aryloxy, acyloxy and aroyloxy. One or more of these groups may be on the same cycloolefinic ring.

Representative of the cycloolefin monomers having twelve carbon atoms and two or three non-conjugated carbon-to-carbon double bonds in the ring are 1,4-, 1,5-, 1,6- and 1,7-cyclododecadienes and the cyclododecatrienes such as 1,4,7-, 1,4,8-, 1,4,9- and 1,5,9-cyclododecatriene. Mixtures of the various cycloolefins may also be used. Also substituted cyclododecadienes and substituted cyclododecatrienes, when they are substituted with the substituents mentioned above, may also be employed. For instance, 1,5,9- trimethylcyclododecatriene, 5-chloro-1,4-cyclododecadiene and other similar substituted 12 carbon atom cycloolefins.

The catalysts of this invention are prepared by mixing the components by well known techniques. No particular order of mixing is required. The catalysts may be prepared by the "preformed" or "in situ" techniques. By the preformed method the catalyst components are mixed together prior to exposure of either component to the monomer to be polymerized. The in situ method consists of adding the catalyst component to the monomer separately. The catalyst components may be mixed either as pure compounds or as suspensions or solutions in liquids which do not adversely affect the polymerization.

The amount of catalyst employed in the polymerizations of this invention may be varied over wide concentrations and has not been found to be critical. Of course, a catalytic amount of the catalyst must be employed to cause polymerization of the monomer. The optimum amount of catalyst depends on a number of factors such as temperature, reactants used, purity of reactants, reaction times desired and the like. Those skilled in the art will readily determine the optimum catalytic ranges. While there is no maximum catalytic level, polymerizations can be conducted wherein the amount of total catalyst employed may range from about 0.001 to about 5.0 parts by weight per 100 parts by weight of monomer employed, although a range of from about 0.01 to about 1.0 is usually desirable, and a range of from about 0.05 to about 0.2 is usually more suitable. The term "total catalyst" is meant to include the weight of both the organometallic and the metal salt compounds. For example, good bulk polymerization rates have been obtained wherein a mixture of 0.05 parts by weight of tungsten hexachloride and 0.04 parts by weight of triisobutylaluminum was used to polymerize one hundred parts by weight of monomer.

In the catalyst composition, the molar ratios of the organometallic compounds to the Group VI$b$ metal salts can be varied over the range of from about 0.1/1 to about 30/1 or higher. However, a mole ratio of about 0.25/1 to about 15/1 is usually preferred. It will be recognized by those skilled in the art that the optimum molar ratio of the catalyst components may vary somewhat with the use of particular combinations of the catalyst components, the monomer being polymerized and the polymerization conditions. For example, in polymerizing 1,5,9- cyclododecatriene with a catalyst comprising an admixture of a trialkylaluminum and tungsten hexachloride, it is usually preferred that the molar ratio of the aluminum compound to the metal salt is in the range of from about 0.4/1 to about 2.5/1.

The polymerizations of this invention may be conducted in solution or in bulk. When the polymerization is carried out in solution, solvents which do not adversely affect the polymerization are desired. Representative of useful solvents are liquid aromatic hydrocarbons such as benzene and toluene; hydrogenated aromatic hydrocarbons such as tetralin; liquid aliphatic hydrocarbons such as pentane, heptane, hexane, petroleum ether, decane; and liquid cycloaliphatic hydrocarbons such as cyclohexane, decalin and cyclooctane. Mixtures of such solvents may also be used.

Temperatures at which the polymerization reaction is carried out can be varied over a wide range. Usually the temperature can be varied from extremely low temperatures such as −60° C. up to high temperatures such as 100° C. or higher. Thus, the temperature is not a critical factor of the invention. It is generally preferred, however, to conduct the reaction at a temperature in the range of from about −20° C. to about 80° C. The pressure at which the polymerization is carried out can also be varied over a wide range. The reaction can be conducted at atmospheric pressure or, if desired, it can be carried out at sub-atmospheric pressure or super-atmospheric pressure. Generally, a satisfactory polymerization is obtained when the reaction is carried out at about autogenous pressure developed by the reactants under the operating conditions used.

The polymerization time will vary and can range from a few seconds to 24 hours or more, depending upon the polymerization conditions and the degree and extent of polymerization desired.

The polymerization reaction may be carried out as a batch or as a continuous process. In performing the polymerizations of this invention, the introduction of the monomer, catalyst, and solvent, when a solvent is employed, can each be made to the reaction zone alternately, intermittently and/or continuously.

It is thought that the polymerizations of this invention take place through a ring-opening polymerization mechanism. Such ring-opening polymerizations of cycloolefins can be used to make a number of alternating copolymers and terpolymers that have not been capable of being made before.

The ring opening polymerization of the cycloolefins containing 12 carbon atoms can also result in perfectly alternating copolymers, terpolymers or even quadripolymers. Also, the ring opening polymerization of the substituted cycloolefins containing 12 carbon atoms in the ring results in perfectly alternating copolymers, terpolymers and quadripolymers.

The ring opening polymerization of cyclododecadienes and cyclododecatrienes results in polymers in which the double bonds are of the trans vinylene type in an amount no greater than about 60 or 70 percent and having a low relative crystallinity index. Whether the crystallinity index is measured by X-ray or by other techniques still indicates that the crystallinity index is low.

The polymers of this invention may be useful as synthetic rubbers either in molded products, such as shoe soles and the like, or fabricated products, such as vehicular tires and industrial belts. In these applications, the rubber is compounded in a conventional manner.

The invention is further illustrated by reference to the following example which is set forth for illustration only.

EXAMPLE I

A four-ounce glass bottle was charged under a nitrogen atmosphere with 22.1 grams of a commercial grade of cyclododecatriene. Four milliliters of a 0.33 molar heptane solution of triisobutylaluminum was then added to the monomer followed by 1.0 ml of a 0.1 molar benzene solution of tungsten hexachloride, all under a nitrogen atmosphere. An instantaneous polymerization occurred resulting in the formation of a high molecular weight polymer.

While certain representative embodiments and details have been shown for the purpose of illustrating the invention, it will be apparent to those skilled in this art that various changes and modifications may be made therein without departing from the spirit or scope of the invention.

What is claimed is:

1. Homopolymers of cycloolefins selected from the group consisting of cyclododecadienes and cyclododecatrienes, said homopolymers being characterized in having the structure of polyalkenamers in which the double bonds are of the cis- and trans-vinylene type and in which the trans-vinylene type are present in an amount no greater than about 70 percent and said homopolymers having a low relative crystalinity index.

2. Homopolymers of cycloolefins selected from the group consisting of cyclododecadienes and cyclododecatrienes, said cycloolefins containing constituents selected from the group consisting of alkyl, aryl, aralkyl, alkaryl and chlorine, said homopolymers being characterized in having the structure of polyalkenamers in which the double bonds are of the cis- and transvinylene type and in which the trans-vinylene type are in an amount no greater than about 70 percent and said homopolymers have a low relative crystalinity index.

3. A tire which is comprised at least in part of polymers defined in accordance with claim 1.

4. A tire which is comprised at least in part of polymers defined in accordance with claim 2.

* * * * *